United States Patent [19]

Imamura

[11] 4,264,314
[45] Apr. 28, 1981

[54] ENDLESS POWER TRANSMISSION BELT

[75] Inventor: Junji Imamura, Kobe, Japan

[73] Assignee: Mitsuboshi Belting Ltd., Kobe, Japan

[21] Appl. No.: 44,290

[22] Filed: May 31, 1979

[30] Foreign Application Priority Data

Oct. 30, 1978 [JP] Japan .................. 53/149708[U]

[51] Int. Cl.³ .............................................. F16G 5/20
[52] U.S. Cl. .................................... 474/205; 474/250
[58] Field of Search ............. 74/231 C, 231 CB, 234, 74/231 R, 229; 474/153, 205, 250

[56] References Cited

U.S. PATENT DOCUMENTS

| 2,802,511 | 8/1957 | Waugh | 74/231 R |
|---|---|---|---|
| 2,941,413 | 6/1960 | Huber et al. | 74/231 |
| 4,002,082 | 1/1977 | Waugh | 74/231 C |
| 4,011,766 | 3/1977 | Waugh | 74/234 |
| 4,034,615 | 7/1977 | Brooks | 74/234 |

OTHER PUBLICATIONS

Japanese Utility Model Application Publication No. SHO-52-117751, dated 3/4/1976; Originator Tatsuo Asai.

Primary Examiner—C. J. Husar
Assistant Examiner—C. L. Berman
Attorney, Agent, or Firm—Sughrue, Rothwell, Mion, Zinn & Macpeak

[57] ABSTRACT

An endless power transmission belt having a plurality of grooves which are formed in the inner surface of the belt in such a manner that the grooves extend perpendicular to the longitudinal axis of the belt, and a plurality of cogs each of which is formed between adjacent grooves thereof. At least two of three factors, groove pitch in the longitudinal direction of said belt, grooves depth and groove cut angle are changed at random. In one example, the groove pitch is changed at random in a range of 60% to 100% of the thickness of said belt, groove depth is changed at random in a range of 20% to 40% of the thickness of the belt, and the groove cut angle is changed at random in a range of 10° to 40°.

9 Claims, 6 Drawing Figures

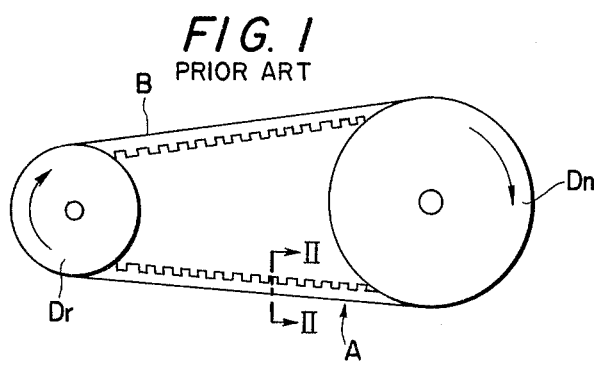
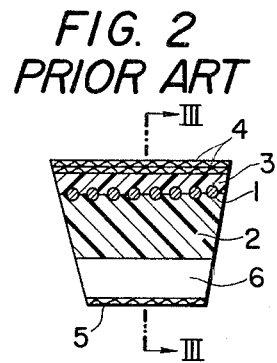
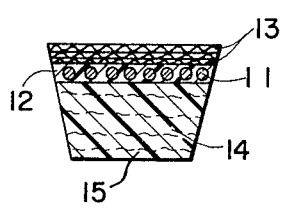
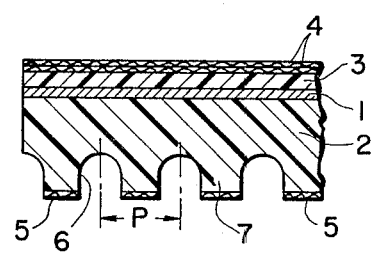
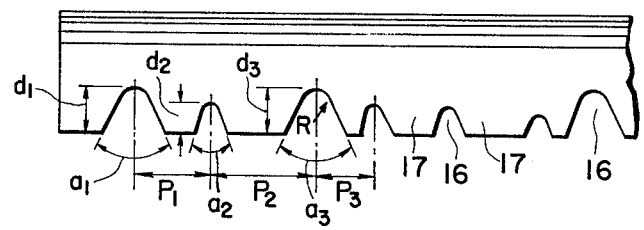
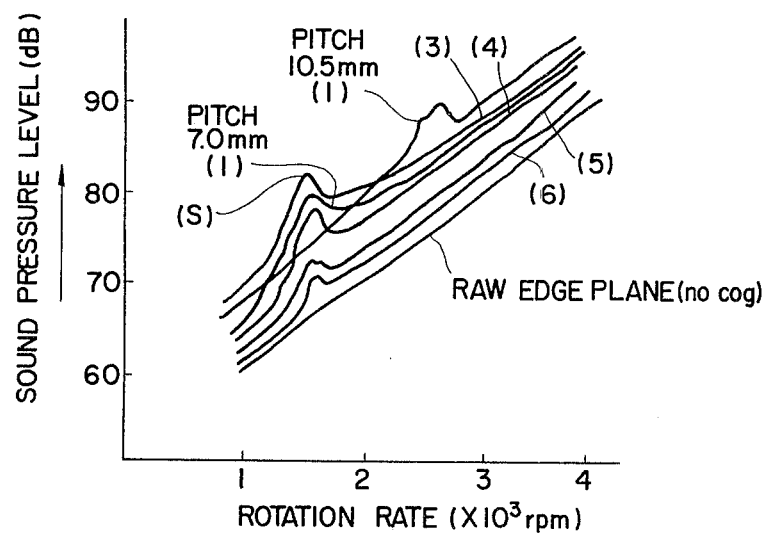

ENDLESS POWER TRANSMISSION BELT

BACKGROUND OF THE INVENTION

This invention relates to an improvement of a so-called cog type V-belt which has notches or grooves in the lower surfaces. The invention is directed toward decreasing the noise to a lower level, which is generated during the run of the belt, by making the cogs of the belt different in pitch, angle and depth from one another.

A conventional cog type V-belt is higher in flexibility than an ordinary V-belt having no cogs. Accordingly, the cog type V-belt is advantageous in that less heat is generated during use, which leads to an increase of its service life. Also, it can be used with a small diameter pulley because of its high flexibility, and therefore it contributes to compact design.

However, the cog type V-belt is still disadvantageous in that it generates noise when operated, and therefore it is not suitable for a location where noise levels should be minimized. Accordingly, even through the cog type V-belt has the above-described advantages of increased power transmission performance, belt service life increases, and use with a small diameter pulley, it is not used as the V-belt in an automobile in which noises should be decreased as much as possible.

The cause of the generation of noises by the cog type V-belt is as follows: At the time that the cog type V-belt received in the pulley groove starts to move away from the pulley, the belt is positioned deep in the pulley groove, because of the belt tension normally applied thereto. Under this condition, the belt is forcibly released from the pulley. In the case of a cog belt, since the belt has grooves in the lower surface engaging the pulley, the belt is intermittently rather than continuously, released from the pulley. At the same time, the pulley side surfaces are wiped by the belt side surfaces, thus generating squeaky sounds. Since this operation is repeatedly carried out, noises result.

On the other hand, the ordinary belt having no grooves in the lower pulley engaging surface is continuously pulled out of the pulley groove, and therefore the volume of noises caused thereby is small.

The characteristic features of the noise caused during the belt drive operation are as follows:

(1) The volume of sound generated at a position where the belt leaves the pulley is a maximum.

(2) The volume of noise caused by the V-belt having no cog is small because the V-belt is continuously pulled out of the pulley. However, the volume of noise caused by the cog type V-belt is large, because the V-belt is intermittently pulled out of the pulley.

(3) If the coefficient of friction of the cog section is decreased, then the belt can be readily pulled out of the pulley and therefore the volume of noise can be made smaller. On the other hand, if the coefficient of friction of the cog section is increased, it becomes difficult to pull the belt out of the pulley, and accordingly the volume of noise is increased. Accordingly, the volume of noise caused by a raw edge type V-belt is larger than that of a wrapped belt having a low coefficient of friction.

(4) If a tension applied to the belt is increased, it becomes more difficult to pull the belt out of the pulley, and accordingly, the volume of noise is increased.

In the case of noise caused by the cog type belt, if the number of revolutions per minute of the driving pulley is increased under the condition that the tension of the belt is maintained unchanged, then the sound pressure level is abruptly increased when the number of revolution per minute reaches a certain value. If the number of revolutions per minute is further increased, then the sound pressure level is decreased initially, but thereafter it is gradually increased. Hereinafter, the sound pressure level abrupt increase at the particular r.p.m. of the driving pulley will be referred to as "a peak sound". In order to use the cog type V-belt in an automobile or a passenger car, it is essential to avoid the generation of the peak sound when the engine is running in the ordinary cruising speed range.

With the cog type V-belt, the r.p.m. with which the peak sound is generated depends on the pitch of the grooves formed in the lower surface of the belt. More specifically, when the groove pitch is increased, the r.p.m. with which the peak sound is generated is also increased. Thus, the r.p.m. with which the peak sound is generated is proportional to the pitch of the grooves formed in the lower surface of the belt. This means that the peak sound is generated when the number of times of pulling the belt cogs out of the pulley groove per unitary time becomes synchronized with the pulley.

In order to overcome the above-described difficulty, a cog type V-belt in which grooves are formed at random pitches in the lower surface of the belt, that is, a so-called random cog V-belt has been proposed as disclosed in Japanese Utility Model Application Publication No. Sho-52-117751. It has been considered therein that this random cog V-belt can decrease the peak sound because it is pulled out of the pulley groove unperiodically that is on a random basis; however, it has been found that in practice the peak sound is not decreased as much as expected merely by changing the cog pitch at random.

It has been found that in order to decrease the peak sound further, it is efficacious to design the belt so that the belt can be more readily pulled out of the pulley i.e., to decrease the frictional resistance to the belt being pulled out of the pulley.

In order to more readily pull the belt out of the pulley, it is efficacious (1) to increase the cog angle, (2) to decrease the cog depth, and/or (3) to decrease the hardness of the cog section. In order to decrease the frictional resistance which is caused when the belt is pulled out of the pulley, it is efficacious (1) to make the belt slippery by covering the cog section or the belt side surfaces with canvas, and (2) to decrease the coefficient of friction of the cog section.

In this invention, in order that the belt may be more readily pulled out of the pulley, grooves are formed in the lower surface of the belt in such a manner that at least two of the groove pitch (p) in the longitudinal direction of the belt, the groove depth (d) and the groove cut angle (a) are changed at random.

In this connection, it is well known in the art that, if the aforementioned groove cut angle is increased, then during the operation of the belt the contact area between the cog section and the pulley is decreased. Hence, the upper surface of the belt is deformed into a concave surface by the side pressure and as a result the belt is dropped into the pulley and the tension of the belt is decreased. If the cog depth is decreased, then the flexibility of the belt is decreased, and therefore the advantageous effects of the cog type belt are lowered.

SUMMARY OF THE INVENTION

In view of the foregoing, the present invention is intended to eliminate or minimize the above-described difficulties, to improve the endless power transmission belt so that the continuous sound, namely, the peak sound caused when the belt leaves the pulley is eliminated. The endless power transmission belt provided according to the invention is a cog type V-belt in which the cog pitch, cog angle and cog depth are selected at random out of the various data thereof.

More specifically, in the cog type V-belt according to the invention, the factors, cog pitch, cog angle and cog depth are changed at random, or only the cog pitch and cog angle are changed at random, or only the cog pitch and cog depth are changed at random, or only the cog angle and cog depth are changed at random. That is, the cog pitch, cog depth and cog angle thus changed at random are suitably combined.

BRIEF DESCRIPTION OF THE DRAWINGS

FIG. 1 is a side view of a power transmission mechanism having a prior art raw edge cog type V-belt;

FIG. 2 is a sectional view taken along line II—II in FIG. 1, showing the prior art cog type V-belt;

FIG. 3 is a sectional side view taken along line III—III in FIG. 2, showing a part of the prior art cog type V-belt;

FIG. 4 is a sectional view of a cog type V-belt according to this invention;

FIG. 5 is a sectional side view taken along line 5-5' in FIG. 4, showing a part of the cog type V-belt according to the invention; and FIG. 6 is a graphical representation indicating the relations between the numbers of revolutions per minute and the sound pressures with respect to various cog type V-belts in which the grooves formed in the lower surface thereof are variously changed.

DETAILED DESCRIPTION OF THE INVENTION

A preferred example of a cog type V-belt according to the invention will now be described.

FIG. 1 is an explanatory diagram showing a power transmission mechanism in which a conventional uniform pitch cog type V-belt is laid over a driving pulley Dr and a driven pulley Dn under a predetermined tension. As described before, when the driving pulley Dr is rotated clockwise in the direction of the arrow, then the sound generated at the position where the belt leaves the driven pulley Dn is the maximum in volume.

FIGS. 2 and 3 are sectional views of the conventional cog type V-belt. This belt comprises a neutral axis section 1, a compression rubber layer 2, a tension rubber layer 3, a top cover cloth 4, and a bottom cover cloth 5. The belt further comprises a plurality of grooves 6 cut in the bottom of the compression rubber layer 2 at predetermined pitches (intervals) in such a manner that the grooves extend across the belt. A cog 7 is formed between adjacent grooves 6. All of the grooves 6 have the same section and the same depth. As the driving pulley Dr is rotated, the cog type V-belt shown in FIGS. 2 and 3 is forcibly removed from the driven pulley Dn. In this case, the V-belt is intermittently pulled from the driven pulley Dn because the above-described plurality of grooves are formed in the lower surface of the V-belt. In this operation, the belt side surfaces are rubbed by the pulley side surfaces. As a result, squeaky sounds are generated. Because this is periodically carried out, noises are generated.

FIG. 4 shows one example of a raw edge cog type V-belt according to this invention. The V-belt has a neutral axis section 11 which is embedded in an adhesion rubber layer 12 and is formed by helically winding a cord. A top cover 13 made of a plurality of bias fabrics is provided on the upper surface of the adhesion rubber layer 12. Provided under the adhesion rubber layer 12 is a compression rubber layer 14. Fibers 15 selected from the group consisting of polyester, polyamide, cotton and rayon fibers are arranged, laterally of the belt, in the compression rubber layer. The bottom surface of the compression rubber layer 14 has no cover cloth, that is, the compression rubber layer 14 is exposed.

A plurality of grooves 16 are formed in the compression rubber layer 14 which is the lower part of the belt, in such a manner that the grooves 16 extend across the layer 14 along the transverse direction of the belt as shown in FIG. 5. Each groove has substantially a triangular shape, with an arcurate top portion to have a radius R. Accordingly, adjacent grooves 16 form a cog 17 extending towards the inner surface of the belt. That is, the grooves 16 and the cogs 17 are provided alternately in the compression rubber layer. Each groove 16 is fundamentally triangular.

The grooves 16 are arranged at different pitches (P) in the longitudinal direction of the belt, and are different in depth (d) and in cut angle (a). Thus, adjacent grooves 16 are different in sectional configuration. The pitches of the grooves may be 60%–100% of the thickness of the belt, the depths of the grooves may be 20%–40% of the thickness of the belt, and the cut angles of the grooves may be in the range of 10 to 40 degress. In the case of a cog type V-belt for an automobile, the best results are obtained when the groove pitches are 6.0 mm–8.0 mm, the groove depths are 2.0 mm–3.0 mm, and the cut angles are 10–40 degrees.

The grooves are determined by the following methods:

METHOD I

Cog type belt 8.5 mm in thickness, for an automobile:

|  | Group | | | | |
| --- | --- | --- | --- | --- | --- |
|  | 1 | 2 | 3 | 4 | 5 |
| Groove pitch (p) mm | 6.0 | 6.5 | 7.0 | 7.5 | 8.0 |
| Groove pitch (d) mm | 2.2 | 2.4 | 2.6 | 2.8 | 3.0 |
| Groove cut angle (a)° | 20 | 25 | 30 | 35 | 40 |

The above-described three factors p, d and a are classified into a plurality of groups as indicated in the above Table. Hence five sets of parameters are determined. Then according to the table of random numbers, the groups of grooves formed in one belt are successively selected, and the grooves are determined from the numerical values specified by the groups. The groove pitches and configurations thus determined are applied to a mold, and the belt is manufactured.

METHOD II

Cog type belt 10.0 mm in thickness, for an automobile:

|  | Group | | | | |
|---|---|---|---|---|---|
|  | 1 | 2 | 3 | 4 | 5 |
| Groove pitch (p) mm | 6.0 | 6.5 | 7.0 | 7.5 | 8.0 |
| Groove depth (d) mm | 2.0 | 2.25 | 2.5 | 2.75 | 3.0 |
| Groove cut angle (a)° | 11 | 18 | 25 | 32 | 39 |

According to the table of random numbers, numerical values are selected for every factor for which a plurality of levels are provided as above, and the groove pitches and configurations are successively determined by combining the numerical values selected for the three factors.

If the grooves are formed in the bottom portion of the compression rubber layer with the groove pitches, depths and cut angles thus determined at random, then the pressures of the cogs applied to the side surfaces of the pulley become non-uniform. As a result, the squeaky sounds generated when the belt is pulled out of the pulley become random; that is, the squeaky sounds are generated intermittently. Thus, the noise level is decreased.

If one of the three factors, groove pitch, groove cut angle and groove depth, is selected at random, the peak sound can to some extent be decreased. However, it has been established that it is difficult to sufficiently decrease the peak sound merely by selecting only one of the three factors at random. Accordingly, in this invention, at least two of the three factors are determined at random. That is, the combinations of pitch and angle, pitch and depth, and angle and depth selected at random, or the combinations of all threes, pitch, angle and depth selected at random are employed.

In general, each groove 16 is extended forming 90° with respect to the longitudinal direction of the belt, however, it may be cut obliquely with respect to the longitudinal axis of the belt. The cog section 17 is, in general, made of cushion rubber 80° in shore hardness. However, if the cogs are made of soft rubber 55° to 65° in hardness, then the peak sound can be decreased more effectively.

In order to clarify the effects of the belt according to the invention, the results of tests conducted with reference to various belts will be described.

Data in the first line of part (3) cog depth changed in columns denoted "Cog Configuration" appearing in the following Table 1 as 0 are intended to mean a raw edge plane type without cogs.

TABLE 1

|  | Cog Configuration | | | When peak sound is generated, | |
|---|---|---|---|---|---|
|  | Cog pitch | Cog angle | Cog depth | r.p.m. of drive shaft | Sound pressure |
| (1) Cog pitch changed | 7.0 mm | 0 | 2.5 mm | 1,500 rpm | 80 dB |
|  | 10.5 | 0 | 2.5 | 2,800 | 89 |
| (2) Cog angle changed | 7.0 | 0 | " | 1,500 | 80 |
|  | " | 10 | " | " | 78 |
|  | " | 20 | " | " | 77 |
|  | " | 30 | " | " | 76 |
|  | " | 40 | " | " | 76 |
| (3) Cog depth changed | 0 | 0 | 0 | 1,500 | 67 |
|  | 7.0 | 0 | 1 | " | 70 |
|  | 7.0 | 0 | 2 | " | 78 |
|  | 7.0 | 0 | 3 | " | 83 |
| (4) Cog pitch selected | Selected at random with 6.0–8.0 | 0 | 2.5 | 1,500 | 79 |
| (5) Cog pitch & cog angle, selected at random | Selected at random with 6.0–8.0 | Selected at random with 10°–40° | 2.5 | 1,500 | 73 |
| (6) Cog pitch, cog angle & cog depth, selected at random | Selected at random with 6.0–8.0 | Selected at random with 10°–40° | Selected at random with 2.0–3.0 | 1,500 | 71 |

Cog angle "zero" means that the neighbouring cogs are extended in parallel with each other. (Cog groove walls are extended in parallel with each other.)

The specifications of the belts used for the tests and the test conditions are as follows:

(1) Belt Specification:

Cog type V-belts 13 mm in upper width, 8.5 mm in thickness and 1000 mm in (circumferential) length were modified to have the following grooves (1) through (6), for the tests.

The tests were conducted for the belt (1) whose cog pitch was changed, the belt (2) whose cog angle was changed, the belts (3) whose cog depth was changed, the belt (4) whose cog pitch was selected at random, the belt (5) whose cog pitch and cog angle were selected at random, and the belt (6) whose cog pitch, cog angle and cog depth were selected at random, so that the sound pressures were measured when the peak sounds were generated, respectively. The test results are as indicated in Table 1 and FIG. 6.

(2) Test Condition

| Test machine | Running condition Pulley diameter: Driving pulley 165 mm, and driven pulley 65 mm R.P.M.: 0–400 r.p.m. |
|---|---|

As is apparent from the above-described Table 1, (1) when the cog pitch is changed, then the r.p.m. is changed at the time of generation of the peak sound; (2) when the cog angle is changed from 0° to 40°, the peak sound is changed from 76 dB to 80 dB; and (3) when the cog depth is changed from 0 mm to 3.0 mm, the peak sound is changed from 67 dB to 83 dB. Furthermore, (4) when the cog pitch is selected at random as 6.0–8.0 mm, the peak sound is 7.9 dB; (5) when the cog pitch is selected at random as 6.0–8.0 mm and the cog angle is selected at random as 10°–40°, the peak sound is decreased to 73 dB; and (6) when the cog pitch is selected at random as 6.0–8.0 mm, the cog angle is selected at random as 10°–40° and the cog depth is selected at random as 2.0–3.0 mm (when all of the factors are selected at random), the peak sound is decreased to a minimum value 71 dB.

The above-described case (3) includes the case where the belt has no cog. Therefore, the case (3) is not suitable for comparison. However, it should be noted that, when compared with the cases (2) through (4) in which only one of the three factors, cog pitch, angle and depth, is selected at random, the case (5) where the cog pitch and angle are selected at random and the case (6) where the cog pitch, angle and depth are selected at random provide a multiple effect to decrease the peak sound to 71 dB.

The relations between the numbers of revolution per minutes and the sound pressures with respect to the various belts in Table 1 are as indicated in a graphical representation in FIG. 6. As shown in FIG. 6, the noise of the ordinary raw edge plane type belt having no cog in the lower surface thereof is lowest. However, this belt is disadvantageous in flexibility. As indicated by reference numeral (1), where the cog pitch is changed, the r.p.m. at the time of generation of the peak sound is changed. When the pitch is 7.0 mm, the peak sound 79 dB is generated with 1500 r.p.m. When the pitch is 1.05 mm, the peak sound 90 dB is generated with 2800 r.p.m.

In the case (3) through (6), the peak sound is produced with 1500 r.p.m. Thus, it can be recognized that the sound pressure is increased with the number of revolution per minute of the belt, and the sound pressure is abruptly increased when the number of revolutions per minute reaches a certain value; that is, there is a peak point (S). Hence, since the r.p.m. of the belt at which the peak sound is generated is proportional to the cog pitch, the change of the cog pitch only may shift the peak sound generating position, but cannot substantially decrease the peak sound.

Accordingly, the cog type V-belt should be run at an r.p.m. other than the r.p.m. at which the peak point (S) occurs. However, with, for example a V-belt in an automobile, it is frequently accelerated or decelerated, and therefore it is impossible to run the V-belt at an r.p.m. other than the r.p.m. at which the peak point (S) occurs. That is, it is impossible for the V-belt to avoid the generation of the peak sound. Thus, the cog type V-belt is disadvantageous in this respect.

However, as is apparent from FIG. 6, it can be concluded that the absolute value of the peak sound (S) is decreased by selecting at least two of the three factors, cog pitch, angle and depth, at random.

As is clear from the above description, in a power transmission V-belt according to this invention, the notches or grooves whose, pitch, angle and depth are selected at random are formed in the lower surface of the belt in such a manner that they extend across the belt. Therefore, the function of the belt is never lowered even when the belt is run at high speed. Furthermore, the reduction of peak sound, regarded as a difficult problem in the art can be accomplished. The V-belt according to the invention can be extensively employed as a noise prevention belt in the field of automobile industry.

What is claimed is:

1. An endless power transmission belt comprising; a belt having a plurality of grooves formed in the inner surface of the belt, said grooves extending perpendicular to the longitudinal axis of the belt, and defining a plurality of cogs formed between adjacent grooves thereof, wherein at least two of the three following factors, groove pitch in the longitudinal direction of said belt, groove depth, and groove cut angle differ from groove to groove at random.

2. A belt as claimed in claim 1, in which said groove pitch is changed at random in a range of 60% to 100% of the thickness of said belt, said groove depth changed at random in a range of 20% to 40% of the thickness of said belt, and said groove cut angle changed at random in a range of 10° to 40°.

3. A belt as claimed in claim 1, in which said groove pitch is changed at random in a range of 60% to 100% of the thickness of said belt, the depths of adjacent grooves changed at random in a range of 20% to 40% of the thickness of said belt, and said groove cut angle has a predetermined value in a range of 10° to 40°.

4. A belt as claimed in claim 1, in which the depths of adjacent grooves are changed at random in a range of 20% to 40% of the thickness of said belt, said groove cut angle changed at random in a range of 10° to 40°, and said groove pitch has a predetermined value in a range of 60% to 100% of the thickness of said belt.

5. A belt as claimed in claim 1, in which said groove cut angle is changed at random in a range of 10° to 40°, said groove pitch changed at random in a range of 60% to 100% of the thickness of said belt, and the depths of adjacent grooves have a predetermined value in a range of 20% to 40% of the thickness of said belt.

6. The device of claims 1, 2, 3, 4 and 5 wherein said belt is a raw edge cog V-belt having a neutral axis section embedded in an adhesion rubber layer and a compression layer disposed under said adhesion rubber layer.

7. The device of claim 6 further comprising a top cover provided on the upper surface of said adhesion rubber layer and wherein the bottom surface of said compression rubber layer is exposed.

8. The device of claim 6 wherein said grooves are formed in said compression rubber layer.

9. The device of claim 6 wherein said compression rubber layer is made of fibers selected from group consisting of polyester, polyamide, cotton and rayon fibers arranged laterally of said belt longitudinal axis.

* * * * *